United States Patent Office 2,913,929
Patented Nov. 24, 1959

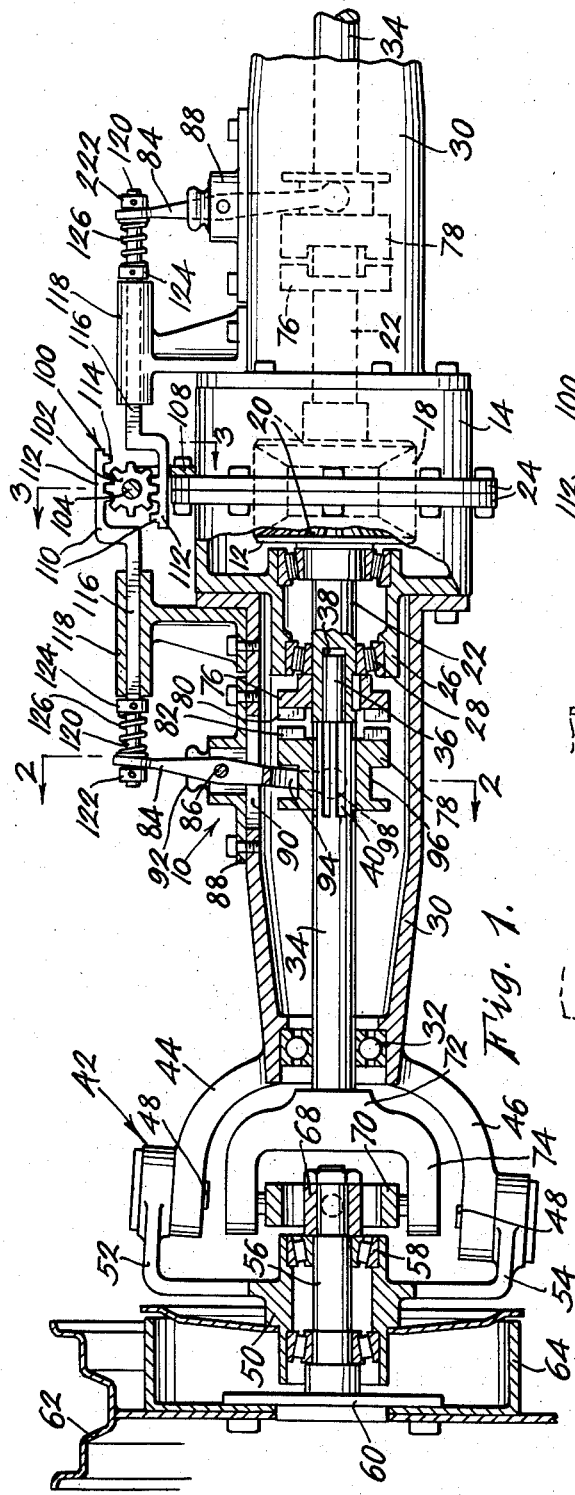

2,913,929

SELECTIVE DRIVE DIFFERENTIAL GEAR AND OPERATING MECHANISM THEREFOR

Martin E. Anderson, Denver, Colo.

Application October 7, 1957, Serial No. 688,487

1 Claim. (Cl. 74—710.5)

This invention relates to selective drive mechanisms and, more particularly, to a clutch and operating mechanism therefor used to connect and disconnect a power shaft of a differential and a front drive axle in a four-wheel drive vehicle.

Most four-wheel drive vehicles include a transfer case which, upon actuation of a shift lever, functions to connect or disconnect the front wheels in either two or four-wheel drive relation. For some time it has been known that such a system has several disadvantages, the most important of which is the fact that even with the front wheels disconnected at the transfer case, the front universals, front differential and connecting shafts must continue to turn with the front wheels thus causing unnecessary wear and premature failure. The most successful attempts to overcome this problem have been through the use of a selective drive clutch on each front wheel which are operative to disconnect the wheel from its associated drive axle in two-wheel drive relation. This, of course, permits the front drive axles, universals, front differential and other driving elements ahead of the transfer case to remain stationary whenever the vehicle is set in two-wheel drive.

The foregoing devices, while a considerable improvement over the transfer case alone, still possess certain disadvantages. First of all, they are manually operated at the wheel which means that in cases of inclement weather, icy pavements and muddy conditions where four-wheel drive is most often used and needed, actuation of the selective drive clutches becomes an extremely unpleasant task. Placing the vehicle in four-wheel drive may also be dangerous as to leave a vehicle unattended on a steep grade or in some other precarious position while the clutches on the wheels are placed in four-wheel drive relation can result in serious injury or at least damage to the truck and load if the vehicle begins to roll.

Another problem is that of aligning the interlocking elements of the selective drive clutch so that the vehicle may be placed in four-wheel drive relation. This is often a difficult and time-consuming task even under the most favorable circumstances. Not infrequently, the vehicle is in a position wherein it cannot be safely rocked back-and-forth even the slight amount usually required to bring the mating elements of the clutch into a position for operative engagement in four-wheel drive relation.

Further, most wheel-operated selective drive clutches must be engaged while the vehicle is stopped in order to place the mating parts in the required relative positions. Many times this is inconvenient as the occasion wherein four-wheel drive is required is often such that it would be highly desirable to keep the truck or other vehicle moving over the ground.

Finally, the prior art selective drive hubs must be separately actuated at each front wheel regardless of whether they are being engaged or disengaged. Here again, considerable time and effort are required to change between two and four-wheel drive due to the fact that each front wheel unit must be taken care of separately.

It is, therefore, the principal object of the present invention to provide a clutch and operating mechanism therefor used to operatively connect and disconnect a differential power shaft with a front drive axle of a four-wheel drive vehicle.

A second object is the provision of means for selectively interconnecting the front wheels of a vehicle in four-wheel drive relation that is operative from the cab or driver's compartment.

A third object is to provide a selective drive clutch mechanism which is operative to connect or disconnect the front wheels from the differential while the vehicle is in motion.

Another object is the provision of a selective drive coupling that functions to connect or disconnect both front wheels from the driving compartment with a single operation required of the driver.

A further object is the provision of means for connecting the front wheels of a vehicle in four-wheel drive relation that does not require pre-positioning of the interlocking elements in mating relation.

Additional objects are to provide a selective drive mechanism for four-wheel drive vehicles that is simple, relatively inexpensive, foolproof, easy to operate, and one that is readily adaptable for use in most of the common four-wheel drive vehicles.

Other objects will be in part apparent and in part pointed out specifically hereinafter in connection with the description of the drawing that follows, in which:

Figure 1 is a fragmentary front view, partly in section and partly in elevation, showing the clutch and operating mechanism therefor of the present invention used to connect the power shaft of a differential to the drive axle of a steerable front wheel;

Figure 2 is a section taken along line 2—2 of Figure 1;

Figure 3 is a fragmentary section taken along line 3—3 of Figure 1;

Figure 4 is a somewhat diagrammatic side view, partly in section, showing the actuating linkage for the clutch in relation to the cab or driving compartment of a vehicle; and, Figure 5 is a view of the operating lever as seen in the direction of arrow 5, Figure 4.

Referring now to the drawing, and in particular to Figure 1 thereof, it will be seen that reference numeral 10 designates in a general way a front-wheel drive assembly of a four-wheel drive vehicle having a conventional differential 12 mounted within a differential housing 14. The differential, of course, includes a driving gear (not shown) operatively connected to drive shaft 16 (Figure 4), differential pinions 18 journaled for rotation on a differential spider inside the driving gear, and differential side gears 20 on the inner ends of differential power shafts 22 in position to mesh with pinions 18. The differential housing 14 is formed in two parts each having a flange 24 which are bolted together and an axial tubular extension 26 within which the differential power shaft 22 is journaled for rotation in axially spaced roller bearings 28.

The front axle housings 30 are bolted or otherwise attached to the ends of the differential housing 14 and include roller bearings 32 at their outer ends within which the front drive axles 34 are journaled for rotation. In the particular form of the invention illustrated herein, the front drive axles 34 terminate at their inner ends in co-axial cylindrical extension 36 of reduced diameter which is journaled for rotation within a co-axial socket 38 in the outer end of the differential power shaft 22. The drive axles 34, in the specific form shown, also include a splined section 40 on the inner portion thereof adjacent extension 36.

Continuing in Figure 1, the conventional steerable front drive wheel assembly, indicated in a general way by numeral 42, will be seen to include upper and lower suspension yoke arms 44 and 46 depending from the outer end of the axle housing 30 and to which is attached for pivotal movement on kingpins 48, a wheel hub 50 by means of upper and lower arms 52 and 54, respectively. A stub shaft 56 is journaled within axially spaced combination radial and thrust bearings 58 mounted in opposite ends of the wheel hub. The outer end of the stub shaft is provided with a drive flange 60 to which is bolted the front wheel 62, only the rim of which has been shown, and the brake drum 64. The driving connection between the inner end of the stub shaft 56 and the outer end of front drive axles 34 is accomplished through a conventional universal joint that includes, in the particular embodiment illustrated herein, a torque bar 68 splined or otherwise attached to the inner end of the stub shaft, ring 70 pivotally attached to the ends of the torque bar, and drive yoke 72 attached to the outer end of the front drive axle and having its arms 74 attached to the ring 70 for pivotal movement. Thus, if it were not for the coupling of the differential shaft 22 and front drive axle 34 in a manner to permit relative rotational movement therebetween, the steerable front drive assembly described so far is substantially conventional.

With reference now to Figures 1 and 2 of the drawing, the clutch unit of the present invention comprises an inner clutch element 76 which is keyed or otherwise fixed to the outer end of differential power shaft 22 for conjoint rotation therewith, and outer clutch element 78 which is non-rotatably mounted on the inner end of the front drive axle for axial slidable movement on splined section 40 thereof. As shown, the opposed faces of clutch elements 76 and 78 include mating tongue and groove surfaces 80 and 82, respectively, which interlock to form a driving connection for the front wheel when element 78 is moved axially inward into engaged position, not shown. In the retracted, inoperative position of clutch element 78 which has been illustrated herein, the front drive axle, of course, rotates independently of the differential power shaft which will be rotating also if the transfer case is actuated to place the vehicle in four-wheel drive. If, however, the front differential is disconnected at the transfer case, only the front drive axles of the front drive system will rotate. At this point it should be mentioned that continuous rotation of the front universals and front axles is of relatively minor importance insofar as premature failure due to excessive wear is concerned when compared with the effect of continuous operation on the front differential and gears of the transfer case up to the point where the operative connection is broken. Even in the present system, however, conventional selective drive hubs can be used on the wheels to disconnect them from the front drive axles during extended periods of two-wheel drive operation.

Axial slideable movement of clutch element 78 is accomplished as shown herein by a forked lever 84 mounted for pivotal movement within a substantially axial plane about pivot pin 86 within axle housing extension 88. The axle housing extension is bolted or otherwise attached to the axle housing 30 in position to open through slot 90 therein within which lever 84 rocks from side-to-side. The upper end of the axle housing extension through which the upper end of lever 84 projects is provided with a flexible dust cap 92. The forked or bifurcated lower end 94 of lever 84 fits into cylindrical section 96 of reduced diameter on the clutch element 78. The bifurcated portion of the lever laps the section 96 of reduced diameter and preferably terminates in enlarged substantially circular end portions 98, as shown. Thus, rockable movement of the operating levers 84 from side-to-side about pins 86 will cause movable clutch elements 78 to reciprocate axially between engaged and disengaged positions relative to fixed clutch elements 76.

In Figures 1 and 3 it can be seen that both of the levers 84 and movable clutch elements 78 are actuated by a single control mechanism including, in the specific embodiment illustrated herein, a rack and pinion arrangement indicated generally by numeral 100. It is to be understood, of course, that the rack and pinion actuating means is intended as being merely illustrative of one type of mechanism that could be used for operating the levers 84; however, other mechanical, electrical and hydraulic control devices could be used equally well for this purpose. In fact, any simple mechanical, electrical or hydraulic reciprocatory movement could be used to rock arms 84 from side-to-side and, therefore, would function to move the clutch elements 84 between engaged and disengaged positions.

The pinion 102 is fixedly attached to transverse shaft 104 that is journaled for rotation between the spaced arms 106 of bracket 108 attached to the differential housing 14. The racks 110 comprise oppositely offset arms 112 having their offset toothed inner ends 114 in operative engagement with the pinion 102 and their substantially co-axial intermediate portions 116 mounted for reciprocal movement within supporting brackets 118 attached to the axle housings 30. The outer ends 120 of each rack are preferably cylindrical and provided with outer and inner collars 122 and 124, respectively, with a compression spring 126 therebetween. The upper end of the levers 84 is mounted between the outer collar 122 and spring 126.

Again with reference to Figure 1, it will be apparent that counter-clockwise rotation of pinion 102 will move the racks 110 outwardly or apart thus acting upon levers 84 in a manner to shift the clutch elements 78 inward axially into engaged position with the mating clutch elements 76. With the transfer case shifted into four-wheel drive position, both the differential power shafts and the front drive axles will be rotating the same direction and at approximately the same speed; but elements 78 and 76 of one of the clutches, or both, may not be in the proper relative positions to engage. When this occurs, and it will be the case more often than not, lever 84 will stop as soon as element 78 touches element 76 thus compressing spring 126 between the upper end of the lever and inner collar 124 on the rack. It is well known, however, that for a number of reasons such as, slippage of the rear wheels, unequal diameters of the front and rear wheels due to tread wear, play or back-lash in the driving connections and relative speeds between the front and rear wheels while turning, the front drive axles and front differential shafts do not turn at the same speed when disconnected thus resulting in a small amount of relative rotation therebetween. Accordingly, as soon as the relative rotation between the front drive axle and the front differential shaft brings associated clutch elements 76 and 78 into position for engagement, spring 124 will act upon lever 84 to complete the driving connection. Therefore, although the racks and pinion function to initiate the driving connection between both drive axles and power shafts simultaneously, the coupling thereof may take place at different times, one or both of which are completed after the shift of the racks takes place. Clockwise movement of the pinion, of course, releases both clutches simultaneously. Obviously, to eliminate any chance of stripping the tongues from the clutch elements, the connection should be made while the vehicle is moving forward slowly in a substantially straight line with the front differential engaged in four-wheel drive relation.

Figures 4 and 5 show one of the several mechanisms that could be used to turn the pinion 102 in either direction from the cab or driving compartment 128 of four-wheel drive vehicle 130. Shaft 104 carrying the pinion is connected to a second shaft 132 passing through the floorboards of the vehicle by a universal shaft coupling 134 of well-known design; whereupon, shaft 134 is mounted for rotation in a suitable supporting mount 136. The upper end of shaft 132 is then provided with a crank 138 having a handle 140 mounted on the free end thereof for rockable movement. The handle includes an L-shaped extension 142 adapted to engage and releasably lock the handle within either of two opening 144 and 146 in the dashboard 148 or the like corresponding to the engaged and disengaged positions of the clutch, respectively.

Having thus described the several useful and novel features of the selective drive clutch and operating means therefor of the present invention, it will be seen that the many useful objects for which it was designed have been achieved. Although but one specific embodiment of the invention has been illustrated and described in the accompanying drawing, I realize that certain changes and modifications therein may occur to those skilled in the art within the broad teaching found herein; hence, it is my intention that the scope of protection afforded hereby shall be limited only insofar as said limitations are expressly set forth in the appended claim.

What is claimed is:

In an automotive vehicle of the four-wheel drive type, a front axle housing provided with a bevel gear differential mechanism having side gears, and with a steerable drive wheel at each end, a differential power shaft projecting outwardly from each side gear, a drive axle extending from each wheel inwardly towards the corresponding differential power shaft, bearing means connecting the opposing ends of each drive axle for free relative rotary motion, a shaft clutch element rigidly attached to the outer end of each differential power shaft, a complemental shaft clutch element slidably splined to the inner end of each drive axle for movement into and out of shaft coupling position, shifting forks pivotally mounted on the housing with their inner ends operatively associated with the slidable clutch elements for moving them into and out of shaft coupling position and with their outer ends accessible from the outside of the housing and manually operable means positioned outside of the housing and operatively connected with the outer ends of the shifting forks adapted to actuate said shifting forks simultaneously and including a spring element for simultaneously subjecting both of the shifting forks to a resilient force tending to move the outer ends of said forks apart, for actuating the shaft couplings, said means further being operative to alternatively apply a non-resilient force to the shifting forks in the opposite direction to disengage the clutches.

References Cited in the file of this patent
UNITED STATES PATENTS

| | | |
|---|---|---|
| 1,018,553 | Cullman | Feb. 27, 1912 |
| 1,033,511 | Zimmerman | July 23, 1912 |
| 1,061,450 | Coleman | May 13, 1913 |
| 1,145,295 | De Witt | July 6, 1915 |
| 1,252,388 | Bickley | Jan. 8, 1918 |
| 1,440,341 | Crispen | Dec. 26, 1922 |
| 1,926,940 | Gaylord | Sept. 12, 1933 |
| 2,019,073 | Cooper et al. | Oct. 29, 1935 |
| 2,620,055 | Fasulo | Dec. 2, 1952 |